United States Patent [19]

Mottate

[11] Patent Number: 4,929,097
[45] Date of Patent: May 29, 1990

[54] THIN-WALLED RECIPROCATING RECTILINEAR MOTION ROLLING GUIDE UNIT EQUIPPED WITH STRESS-RESISTING BALL RETAINER

[75] Inventor: Tatsuo Mottate, Mitaka, Japan

[73] Assignee: Nippon Thompson Co., Ltd., Tokyo, Japan

[21] Appl. No.: 407,743

[22] Filed: Sep. 15, 1989

[30] Foreign Application Priority Data

May 11, 1989 [JP] Japan .................................. 64-116060

[51] Int. Cl.⁵ ............................................. F16C 29/04
[52] U.S. Cl. ........................................ 384/49; 384/18; 312/331
[58] Field of Search ............................. 384/18, 49, 50; 312/331

[56] References Cited

U.S. PATENT DOCUMENTS 3,857,618 12/1974 Hagen et al. ........................... 384/18
3,975,063 8/1976 Mahotka et al. ....................... 384/18
4,351,575 9/1982 Röck et al. ............................ 384/18

Primary Examiner—Thomas R. Hannon
Attorney, Agent, or Firm—Rogers & Killeen

[57] ABSTRACT

A thin-walled rectilinear motion rolling guide unit comprising a bed member, a table member slidably movable relative to said bed member in the longitudinal direction, and a ball retainer interposed between said two members.

According to the present invention, a rack and pinion mechanism is provided between said table member and ball retainer, with the use of a different teeth-meshing ratio between the table member and the ball retainer such that the speed in rectilinear motion of the former is greater than that of the latter such as a value of 2:1 for example, so that by decreasing the relative velocity of the ball retainer with the table member, the displacement of the former with the latter in operation can be prevented under any stress applied vertically onto the unit, insuring a high precision operation with less sliding resistance.

8 Claims, 5 Drawing Sheets

THIN-WALLED RECIPROCATING RECTILINEAR MOTION ROLLING GUIDE UNIT EQUIPPED WITH STRESS-RESISTING BALL RETAINER

BACKGROUND OF THE INVENTION

1. Field of the Invention

The present invention relates generally to a thin-walled rectilinear motion rolling guide unit and relates more particularly to said guide unit equipped with stress-resisting ball retainer capable of being miniaturized as a whole, thereby insuring high accuracy and long durability of a rectilinearly reciprocating movement of the guide unit.

2. Description of the Prior Art

A stress-resisting ball retainer was generally employed in telescoping ball bearing slides including conventional rack means and mating pinions such as, for example, in the invention of U.S. Pat. No. 3,857,618 specification.

As clearly illustrated in the specification and particularly in FIG. 1 of the said U.S. patent, the pinion shafts are disposed in parallel to the upper surfaces of telescoping ball bearing slides.

In the prior art invention, when radial load is applied to said slide unit, vertical displacement takes place in the telescoping slides, thereby influencing the meshing condition between the rack members and the pinions such that the rotational friction of the pinions are increased. For this reason, telescoping slides of the U.S. patent can find only a limited application due to a rather poor performance as rectilinear reciprocating motion rolling units such as, for example, telescoping slide members exclusively used for a cabinet drawers and a cabinet desk.

Further, FIG. 10 of the above-mentioned U.S. patent illustrates a technology wherein to prevent the meshing conditions during operation, varying between rack means and pinion means due to vertical displacement of the overlying table means, the surface of the table is positioned vertical to the axis of the pinion but, in this case, the rotational axis of the pinion must be supported on an intermediate member corresponding to the ball retainer of FIG. 1, therefore a substantial mechanical strength as well as complicated configuration is required for the fabrication of the intermediate member, resulting in a higher production cost.

Moreover, the unit disclosed by the U.S. patent has no driving means installed in itself so that separate driving means for moving the slide members was required.

SUMMARY OF THE INVENTION

As mentioned above, a number of problems were pending in the structure of prior rectilinear motion rolling guide units bringing about technological disadvantages but according to the present invention, the pending problems have now been solved by utilizing a combination of rack means and mating pinion means between ball retainer and table member while the rotation axis of pinion means is arranged in vertical to the upper surface of the table member so that even under any radial load applied thereto causing a vertical displacement between two relatively movable members, the meshing conditions between the rack means and pinion means do not change due to a unique structure wherein the pinion shaft is secured onto a bed member with which said table member relatively moves in opposite rectilinear directions, yet enabling to simplify the configuration of the ball retainer with a thinner wall.

Moreover, according to the present invention, the rotational shaft of pinion as such can be employed as a drive shaft so that the unit as a whole can be miniaturized.

It is an object of the present invention, therefore, to provide a mechanism of a thin-walled rectilinearly reciprocating motion rolling guide unit equipped with stress-resisting retainer so as to insure highly accurate rectilinear rolling motion between the moving slide members.

BRIEF DESCRIPTION OF THE DRAWINGS

Referring to the drawing.

DESCRIPTION OF THE PREFERRED EMBODIMENTS

Figure 1:
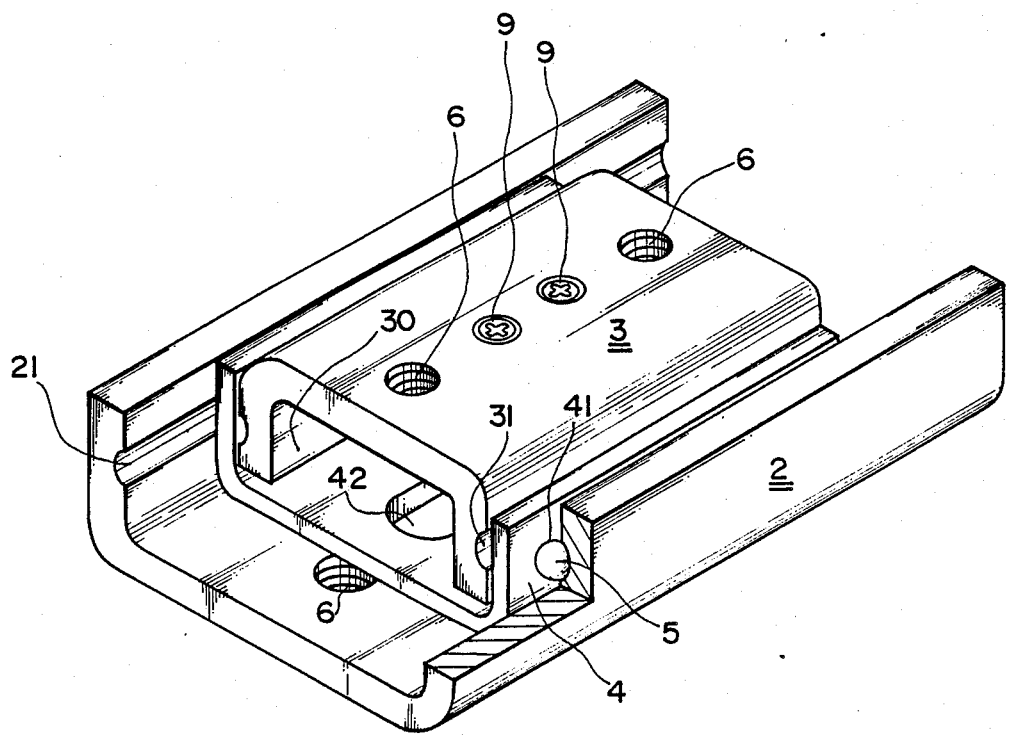
FIG. 1 is a partially broken, perspective view of a thin-walled reciprocating rectilinear motion rolling guide unit embodying a first embodiment of the present invention.

Referring particularly to FIGS. 1, 2, 3, 4 and 5, there is shown a first embodiment of the present rectilinear motion rolling guide unit, wherein the whole structure of the first embodiment is illustrated in FIG. 1 in a perspective view consisting of a bed member 2, a table member 3 and a ball retainer 4 with a plurality of balls 5.

Said bed member 2, table member 3 and bearing balls 5 are usually made from stainless steel, while the other parts used for constructing the present unit may be made from synthetic plastic material, particularly highly wear-resisting plastics.

The present rectilinear motion rolling guide unit can be made smaller in dimension such that it can be placed and carried on the palm of human being.

As shown in FIG. 1, the bed member 2 is formed longer in its longitudinal length having a U-shaped cross section, thereby forming a trough-shaped groove 20 therein that is defined by two opposing vertical walls, on whose inner surfaces are provided at and along a predetermined height, horizontally extending opposing ball track grooves 21.

Figure 2:
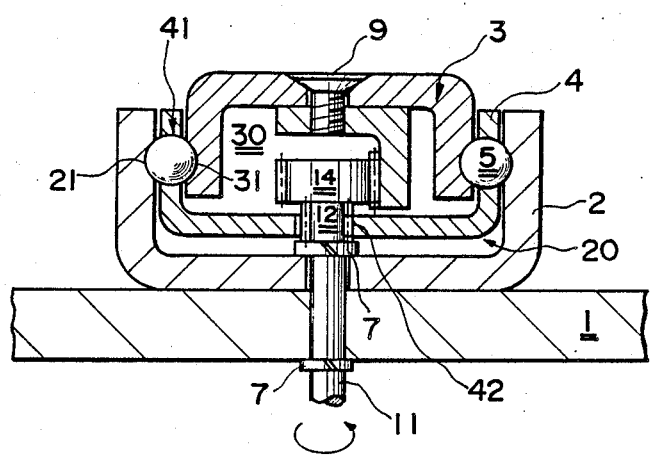
FIG. 2 is a cross sectional view of the first embodiment shown in FIG. 1.
Figure 5:
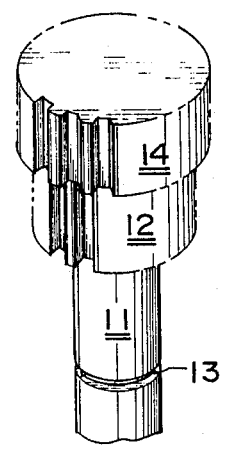
FIG. 5 is an enlarged perspective view of the pinion bolt employed in the first embodiment of the present invention.

According to the first embodiment of the present invention as shown in FIG. 2, the elongated bed member 2 is securely fixed on a plate-like base member 1 by means of any suitable fastening means such as flush rivets, welding and like with a pinion bolt 11 rotatably penetrating therethrough, the lower end of which extends as far as below said base member to be connected to suitable rotational drive means such as an electric motor, while the upper end thereof forms a pinion assembly as shown in FIG. 5, projecting through the bottom wall of a ball retainer 4. Namely, said pinion bolt 11 can be freely rotated through the base member 1 and bed member 2 while the lower part of pinion, that will be mentioned later, is brought into a gear drive engagement with first rack means that will also be mentioned hereinafter.

Within the trough-shaped groove 20 of the bed member 2 is inserted the table member 3 as illustrated in FIGS. 1 and 2 in a spaced relation with each other. The said table member 3 has a longitudinal length greater than its width with an inverted U-shaped cross section, while horizontal ball-track grooves 31 are formed on the outer surfaces of the opposing side walls thereof at and along a predetermined height, which are adapted to be brought into facing relation with the above-mentioned horizontal ball-track grooves 21 formed on the opposing inner wall surfaces of the bed member 2 for receiving a plurality of balls rotatably therebetween.

Between said bed member 2 and said table member 3 and within the trough shaped groove 20 of the bed member 2 is intervened a ball retainer 4 having a longitudinal length substantially similar to that of the table member 3 and a U-shaped cross section in such a manner that the ball retainer 4 embraces, between its opposing sidewalls, the opposing sidewalls of said table member 3.

Figure 3:
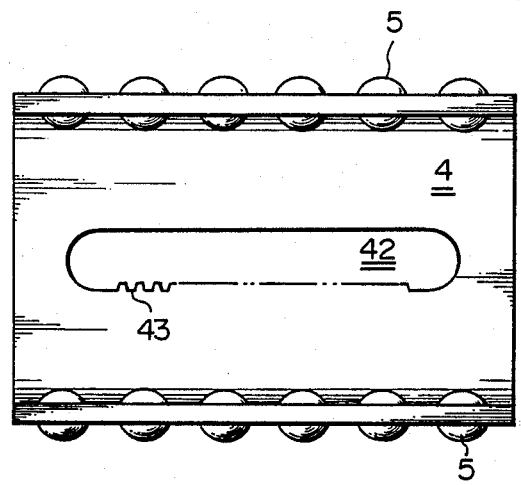
FIG. 3 is a plan view of a ball retainer employed in the first embodiment according to the present invention.

As illustrated in FIGS. 1, 2 and 3, a plurality of balls 5 are retained in each of the opposing sidewalls of the ball retainer 4 such that at and along a suitable height are provided a plurality of equi-spaced circular ball retaining openings 41 in a horizontal row, allowing free rotation of each ball retained therein.

With such a construction, the ball retainer 4 when it has been assembled with said bed member 2 and table member 3, the plurality of balls 5 retained by said ball retainer 4 are brought into aligned contact with the horizontal ball track grooves 21 and 31 of the bed member 2 and table member 3, respectively, in a sandwiched contact fashion so as to establish a freely slidable ball bearing between the three members movable with one another.

The ball retainer 4 is further provided, in its bottom wall, a longitudinally and centrally extending elongated opening 42 with a first rack 43 formed along one of the side edges thereof as shown in FIG. 3. As already mentioned, the pinion bolt 11 (FIGS. 2 and 5) is freely rotatably held within the plate-like base member 1 with its lower end being connected to suitable rotational drive means, while with its upper portion penetrating through the overlying bottom wall of the bed member 2 and then through the elongated opening 42 provided in the ball retainer 4.

As clearly shown in FIG. 5, the pinion bolt 11 employed according to the first embodiment of the present invention has a composite pinion assembly in its upper portion, consisting of a lower pinion 12 having a smaller diameter and an upper pinion 14 having a greater diameter integrally formed therewith.

The teeth of the lower or first pinion 12 and upper and second pinions 14 are formed the same in the form and size, so that the number of the teeth for each pinion is varied accordingly.

It should be understood that as will be more fully explained hereinafter, the teeth of the first rack 43 are adapted to be meshed with those of said first pinion 12, so as to transmit the driving motion of the pinion to the ball retainer 4, while the ratio of the number of teeth of first pinion 12 with that of second pinion 14 decides the relative speed of the table member 3 with the ball retainer 4 when they move together in the longitudinal direction.

According to the present first embodiment, the teeth number ratio between the first pinion 12 and the second pinion 14 is set to 1:2, though this ratio may be varied dependent on the relative speed desired between the two slide members 3, 4.

Figure 4:
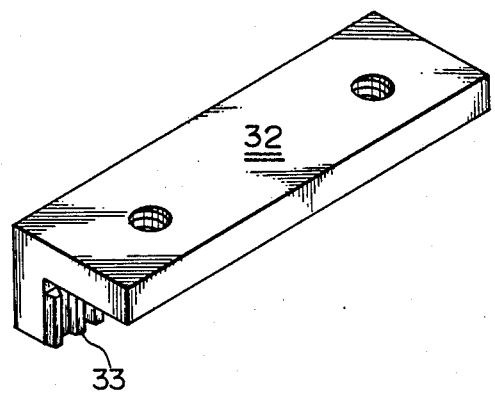
FIG. 4 is an enlarged perspective view of second rack means employed in the first embodiment of the present invention.

Now referring to FIGS. 2 and 4, the table member 3 is further provided, on the lower surface of the upper wall thereof, with a longitudinally and centrally extending second rack member 32 having a longitudinal length substantially similar to that of said upper wall. As clearly shown in FIG. 4, the second rack member 32 has an L-shaped cross section with a rack 33 being formed on and along one of the inner side surfaces.

The second rack member 32 may be secured in cantilever fashion on the lower surface of upper wall of the table member 3 with the aid of suitable fastening means such as flush rivets 9 in such a manner that the rack surface 33 of the second rack member 32 extends longitudinally while the rack surface is displaced a certain distance from the longitudinal and central line of the table member 3, while it faces laterally to snugly mesh the teeth of upper or second pinion 14 provided on the pinion bolt 11 that projects upwardly from the elongated opening 42 of the ball retainer 4.

As illustrated in FIGS. 2 and 5, the pinion bolt 11 has a circumferential groove 13 at its intermediate height for receiving a washer 7 therein, so as to form a space gap between the bottom walls of the adjacent bed member 2 and ball retainer 4, respectively, when they have been assembled.

Further referring to FIGS. 2, 3, 4 and 5, when the bed member 2, ball retainer 4 and table member 3 have been assembled on the base member 1, with a rotationally driven pinion bolt 11 penetrating through the base member 1, bed member 2 and the elongated opening 42 of ball retainer 4 in that order, as well as the first pinion 12 being meshed with the first rack 43 provided along the side edge of the elongated opening 42 thereof, the upper or second pinion 14 is automatically brought into gear driven engagement with the above-mentioned second rack 33 that directly faces sidewise therewith as mentioned above.

Like the first pinion 12 and the first rack 33, the tooth form and size are the same between the second pinion 14 and the second rack 33 so that peripheral speed of the rotating second pinion 14 drives the table member 3 at the corresponding speed in the longitudinal direction.

As stated above, the table member 3 is assembled with the upper or second pinion 14 in a gear driven fashion, whereas the ball retainer 4 is engaged with the lower or first pinion 12 via the above-mentioned rack and pinion engagement, while said first pinion 12 differs from the second pinion 14 in the number of teeth such as 1:2 in the present first embodiment, so that upon the rotation of the pinion bolt 11, the ball retainer 4 makes a longitudinal movement by a distance half that of the table member 3 due to the gear ratio set between the first and second pinions 12, 14, therefore upon the rotation of the pinion bolt 11, the table member 3 makes a longitudinal rectilinear movement relative to the stationary bed member 2 with the ball retainer 4 being interposed therebetween making a longitudinal rectilinear movement half the distance the table member 3 makes.

As mentioned above, the ball retainer 4 interposed between the stationary bed member 2 and the longitudinally movable table member 3 does move in a limited distance but it is securely and invariably kept in meshing relation between the first pinion 12 and the mating first rack 43, while at the same time, the second rack 33 secured to the table member 3 is securely and invariably kept in rack and pinion engagement with the second pinion 14 as well as the pinion bolt 11 is prevented to make any vertical movement relative to the base member 1 and the bed member 2 due to vertically clamping engagement with the aid of washer means 7 so that any undesired displacement, during the operation, of the ball retainer 4 relative to the table member 3 and bed member 2 can be prevented.

As may be self-explanatory from FIG. 2, the relative positioning of the bed member 2, table member 3 and ball retainer 4 is simply and conveniently carried out with the use of such a simple structure of ball retainer as providing a plurality of balls 5 rotatably held within horizontally aligned ball retaining openings 41, thus minimizing abrasion resistance, derivable from the intervention of the ball retainer 4 between the adjacent table and bed members 3, 2.

Figure 6:
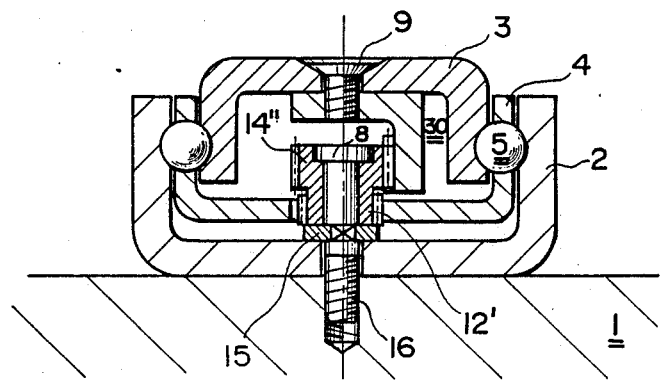
FIG. 6 is a cross sectional view of a second embodiment of the present invention.

FIG. 6 illustrates the second embodiment in cross section of the present invention but even in the second embodiment, the construction and structure, such as the rack and pinion engagement between the table member and ball retainer 3, 4 are substantially the same as those of the first embodiment, excepting the drive means being directly connected to the table member to effect the longitudinal rectilinear movement thereof relative to the bed member 2 as well as the pinion bolt having a freely rotatable composite pinion assembly mounted thereon.

Figure 7:
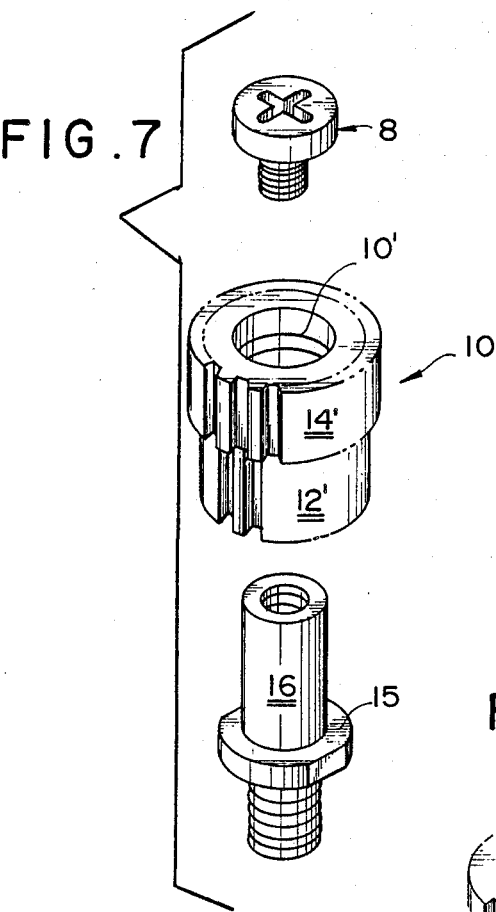
FIG. 7 is an enlarged exploded view of the pinion bolt employed in the second embodiment of the present invention, clarifying the coupling relation between a pinion bolt and a pinion assembly to be coupled therewith.

FIG. 7 illustrates an exploded view of the pinion bolt assembly employed in the second embodiment of the present invention. To fabricate the pinion bolt assembly, a pinion bolt 16 with an intermediate flange 15 is inserted into a central bore 10' of an integrated composite pinion assembly designated generally as 10 in FIG. 7 until the lower end surface of the composite pinion assembly 10 has securely seated on said flange 15, while the thus assembled composite pinion 10 is fastened at the upper end with a flush rivet 8 or the like that is in turn threaded into the threaded central bore formed in the upper portion of said pinion bolt 16, yet allowing a free rotation of the composite pinion assembly 10 therearound.

As clearly illustrated in FIGS. 6 and 7, and unlike the pinion bolt 11 of the first embodiment, the lower portion of the pinion bolt 16 is formed as a screw that is in turn to the driven into the base member 1 to be securely embedded therein, while the above-mentioned intermediate flange 15, serves to be a spacer between the adjacent bottom walls of the bed member 2 and table member 3, respectively, for the formation of a clearance therebetween.

Again referring to FIG. 7, the composite pinion assembly 10 to be freely rotatably mounted onto upper portion of the stationary pinion bolt 16 consists, like the pinion assembly of the first embodiment, of a lower or first pinion 12' having a smaller diameter and an upper or second pinion 14' having a larger diameter integrally formed directly thereon with a longitudinally and concentrically extending bore 10' being formed therethrough thereby providing a slide bearing surface between the outer surface of said pinion bolt 11' and the inner surface of the longitudinally and concentrically extending bore of the integral composite pinion assembly 10.

In this second embodiment also, the teeth of the first and second pinions 12' and 14' are the same in the form and size, while the teeth number ratio between the two adjacent pinions 12' and 14' are made to 1: 2 as in the case of the first embodiment, though this teeth number ratio may be varied as desired to meet the particular purpose.

With the use of such a teeth number ratio as mentioned above, the relative movement between the table member 3 and the ball retainer 4 is controlled such that the latter moves exactly one-half the distance and/or speed as the table member 3 moves so that during the operation, any positional displacement in longitudinal direction of the ball retainer 4 relative to the table and/or bed members can be prevented.

Figure 8:
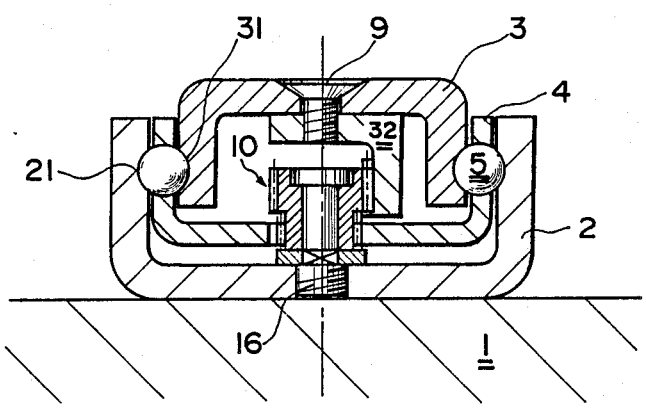
FIG. 8 is a cross sectional view of a third embodiment of the present invention.

FIG. 8 is a cross section of a third embodiment of the present invention, wherein the construction of the unit as a whole is substantially the same as the second embodiment, excepting the pinion bolt 16 being securely embedded at the lower end in the bottom wall of the bed member 2.

With such a construction all the constitutional parts of the present unit can be assembled together in a compact fashion so as to facilitate the carrying and handling of the unit compared with the other embodiments.

As having been fully explained above, the present invention provides a thin-walled rectilinear motion rolling guide unit featured by compactness in size and greater accuracy in operation, which has been realized by combining rack and pinion mechanism in not only a reasonable manner but also compact fashion, thereby to completely prevent, in operation, any undesirable displacement of the ball retainer relative to the table and bed members relatively movable therewith.

Even when the rack and pinion mechanism has accidentally been destroyed during operation, the ball retainer is immediately stopped as it cannot move further with its elongated opening 42 always keeping the pinion bolt therewithin, so that any accidental separation of the ball retainer from the unit can be prevented.

As constructed mentioned above, the present rectilinear motion rolling guide unit is featured by prevention of any undesirable displacement of the ball retainer from the other relatively movable members particularly with a relative movement ratio between the table member and the ball retainer of 2:1 or any other predetermined value, so as to keep a decreased movement of the ball retainer relative to the movement of the table member in operation.

Further, the driving source for effecting the rectilinear relative motion of the unit can be installed within the unit so that a miniaturization thereof can be easily realized yet the construction thereof being compact and strong.

Last but not least is a high precision operation of the present unit under any heavy load applied thereto in radial direction, since such a load does not influence the rack and pinion engagement unique to the present invention.

The present invention and its advantages will be understood from the foregoing description and it will be apparent that various changes may be made in the form, construction and arrangement of the parts without departing from the spirit or scope thereof or sacrificing its material advantages, the arrangement hereinbefore described being merely by way of example and it should not be considered to be restricted to the specific form shown or uses mentioned except as defined in the accompanying claims.

What is claimed is:

1. A thin-walled rectilinear motion guide unit equipped with stress-resisting ball retainer, comprising a plate-like base member (1) having a vertically extending pinion bolt (11) penetrating therethrough in a freely rotatable fashion, an elongated bed member (2) having a U shaped cross section to form a trough-shaped groove (20) therein and secured onto the upper surface of said base member (1), a horizontal ball track groove (21) being provided on the inner surface of each of the opposing side walls of said bed member (2) at a predetermined height from the bottom wall thereof, an elongated table member (3) having an inverted U shaped cross section and adapted to be inserted within said trough-shaped groove (20) of the bed member (2) in a spaced and longitudinally freely slidable fashion, a horizontal ball track groove (31) being provided on the outer surface of each of the opposing side walls of said table member (3) at such a height as capable of oppositely facing the above-mentioned horizontal ball track groove (21) of the bed member (2), an elongated ball retainer (4) having a U-shaped cross section and adapted to be interposed within said trough-shaped groove (20) of the bed member (2), and between said bed member (2) and said table member (3), said ball retainer (4) providing, in the opposing side walls, a plurality of ball retaining openings (41) aligned in an equispaced relation with one another in a horizontal row at such a height as capable of directly facing, at both sides, the above-mentioned horizontal ball track grooves (21, 31) of the bed and table members (2, 3), respectively, so as to retain the respective balls (5) therein in a freely rotatable fashion, as well as a longitudinally and centrally extending elongated opening (42) in the bottom wall of said ball retainer (4) with a first rack (43) being provided on and along one of the side edges thereof, the above-mentioned vertically extending pinion bolt (11) further penetrating through the bottom wall of the overlying bed member (2) at a substantially central position thereof relative to both the longitudinal and lateral directions until it passes through said elongated opening (42) of the ball retainer (4) wherein is securely mounted on the upper portion of said pinion bolt (11), a composite pinion assembly consisting of a lower or first pinion part (12) having a smaller diameter adapted to mesh said first rack (43) and an upper or second pinion part (14) integrally and concentrically formed with said first pinion part (12) directly thereon, an elongated second rack member (32) having an L-shaped cross section and a longitudinal length substantially the same as that of the table member (3), forming a second rack (33) on and along one of the inner sidewalls thereof, said second rack member (32) being attached in cantilever fashion on the lower surface of said table member (3) extending in the longitudinal direction in such a manner that the second rack (33) is brought into meshing engagement with the above-mentioned upper or second pinion part (14) within the trough-shaped groove (30) of the table member (3) and the teeth of said first pinion part (12) and second pinion part (14) being formed the same in form and size but the number of the former teeth being twice the number of the latter teeth.

2. The thin-walled rectilinear motion guide unit as claimed in the foregoing claim 1, wherein one end of said pinion bolt (11) is connected with rotation drive means.

3. The thin-walled rectilinear motion guide unit as claimed in claim 2, wherein the teeth of the lower or first pinion part and those of the upper or second pinion part are the same in form and size but the number of the latter teeth is several times the number of the former teeth.

4. The thin-walled rectilinear motion guide unit as claimed in claim 1, wherein the teeth of the lower or first pinion part and those of the upper or second pinion part are the same in form and size but the number of the latter teeth is several times the number of the former teeth.

5. A thin-walled rectilinear motion guide unit equipped with stress-resisting ball retainer, comprising a plate like base member (1) having a vertically extending pinion bolt (16) with the lower end being securely embedded thereinto and the upper end extending upwardly therefrom, an elongated bed member (2) having a U-shaped cross section to form a trough-shaped groove (20) therein and secured onto the upper surface of said base member (1), a horizontal ball track groove (21) being provided on the inner surface of each of the opposing side walls of said bed member (2) at a predetermined height from the bottom wall thereof, an elongated table member (3) having an inverted U-shaped cross section and adapted to be inserted within said trough-shaped groove (20) of the bed member (2) in a spaced and longitudinally freely slidable fashion, a horizontal ball track groove (31) being provided on the outer surface of each of the opposing side walls of said table member (3) at such a height as capable of oppositely facing the above-mentioned horizontal ball track groove (21) of the bed member (2), an elongated ball retainer (4) having a U-shaped cross section and adapted to be interposed within said trough-shaped groove (20) of the bed member (2), and between said bed member (2) and said table member (3), said ball retainer (4) providing, in the opposing side walls, a plurality of ball retaining openings (41) aligned in an equi-spaced relation with one another in a horizontal row at such a height as capable of directly facing, at both sides, the above-mentioned horizontal ball track grooves (21, 31) of the bed and table members (2, 3), respectively, so as to retain the respective balls (5) therein in a freely rotatable fashion, as well as a longitudinally and centrally extending elongated opening (42) in the bottom wall of said ball retainer (4) with a first rack (43) being provided on and along one of the side edges thereof, the above-mentioned vertically extending pinion bolt (16) further penetrating through the bottom wall of the overlying bed member (2) at a substantially central position thereof relative to both the longitudinal and lateral directions until it passes through said elongated opening (42) of the ball retainer (4) wherein is freely rotatably mounted on the upper portion of said pinion bolt (16), a composite pinion assembly (10) consisting of a lower or first pinion part (12') having a smaller diameter adapted to mesh said first rack (43) and an upper or second pinion part (14') integrally and concentrically formed with said first pinion part (12') directly thereon, an elongated second rack member (32) having an L-shaped cross section and a longitudinal length substantially the same as that of the table member (3), forming a second rack (33) on and along one of the inner sidewalls thereof, said second rack member (32) being attached in cantilever fashion on the lower surface of said table member (3) extending in the longitudinal direction in such a manner that the second rack (33) is brought into meshing engagement with the above-mentioned upper or second pinion part (14') within the trough-shaped groove (30) of the table member (3) and the teeth of said first pinion part (12') and second pinion part (14') being formed the same in form and size but the number of the former teeth being twice the number of the latter teeth.

6. The thin-walled rectilinear motion guide unit as claimed in claim 5, wherein the teeth of the lower or first pinion part and those of the upper or second pinion part are the same in form and size but the number of the latter teeth is several times the number of the former teeth.

7. A thin-walled rectilinear motion guide unit equipped with stress-resisting ball retainer, comprising an elongated bed member (2) having a U-shaped cross section to form a trough-shaped groove (20) therein and a vertically extending pinion bolt (16) with the lower end being securely embedded into the bottom wall thereof and the upper end extending upwardly therefrom, a horizontal ball track groove (21) being provided on the inner surface of each of the opposing side walls of said bed member (2) at a predetermined height from the bottom wall thereof, an elongated table member (3) having an inverted U-shaped cross section and adapted to be inserted within said trough-shaped groove (20) of the bed member (2) in a spaced and longitudinally freely slidable fashion, a horizontal ball track groove (31) being provided on the outer surface of each of the opposing side walls of said table member (3) at such a height as capable of oppositely facing the above-mentioned horizontal ball track groove (21) of the bed member (2), an elongated ball retainer (4) having a U-shaped cross section and adapted to be interposed within said trough-shaped groove (20) of the bed member (2), and between said bed member (2) and said table member (3), said ball retainer (4) providing, in the opposing side walls, a plurality of ball retaining openings (41) aligned in an equi-spaced relation with one another in a horizontal row at such a height as capable of directly facing, at both sides, the above-mentioned horizontal ball track grooves (21, 31) of the bed and table members (2, 3), respectively, so as to retain the respective balls (5) therein in a freely rotatable fashion, as well as a longitudinally and centrally extending elongated opening (42) in the bottom wall of said ball retainer (4) with a first rack (43) being provided on and along one of the side edges thereof, the above-mentioned vertically extending pinion bolt (11') further penetrating through the bottom wall of the overlying bed member (2) at a substantially central position thereof relative to both the longitudinal and lateral directions until it passes through said elongated opening (42) of the ball retainer (4) wherein is freely rotatably mounted on the upper portion of said pinion bolt (11), a composite pinion assembly (10) consisting of a lower or first pinion part (12') having a smaller diameter adapted to mesh said first rack (43) and an upper or second pinion part (14') integrally and concentrically formed with said first pinion part (12') directly thereon, an elongated second rack member (32) having an L-shaped cross section and a longitudinal length substantially the same as that of the table member (3), forming a second rack (33) on and along one of the inner sidewalls thereof, said second rack member (32) being attached in cantilever fashion on the lower surface of said table member (3) extending in the longitudinal direction in such a manner that the second rack (33) is brought into meshing engagement with the above-mentioned upper or second pinion part (14') within the trough-shaped groove (30) of the table member (3) and the teeth of said first pinion part (12') and second pinion part (14') being formed the same in form and size but the number of the former teeth being twice the number of the latter teeth.

8. The thin-walled rectilinear motion guide unit as claimed in claim 7, wherein the teeth of the lower or first pinion part and those of the upper or second pinion part are the same in form and size but the number of the latter teeth is several times the number of the former teeth.

* * * * *